US011134376B2

(12) United States Patent
An et al.

(10) Patent No.: US 11,134,376 B2
(45) Date of Patent: *Sep. 28, 2021

(54) 5G DEVICE COMPATIBILITY WITH LEGACY SIM

(71) Applicant: T-Mobile USA, Inc., Bellevue, WA (US)

(72) Inventors: Kyeong Hun An, Sammamish, WA (US); Mathew George, Kirkland, WA (US); Phani Ramisetty, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 348 days.

This patent is subject to a terminal disclaimer.

(21) Appl. No.: 16/228,635

(22) Filed: Dec. 20, 2018

(65) Prior Publication Data

US 2020/0204985 A1    Jun. 25, 2020

(51) Int. Cl.
*H04W 12/03*    (2021.01)
*H04L 9/30*    (2006.01)
(Continued)

(52) U.S. Cl.
CPC ........... *H04W 12/03* (2021.01); *H04L 9/0825* (2013.01); *H04L 9/3066* (2013.01); *H04W 4/60* (2018.02);
(Continued)

(58) Field of Classification Search
CPC ..... H04W 12/03; H04W 12/72; H04W 8/183; H04W 12/02; H04W 8/02; H04W 4/60;
(Continued)

(56) References Cited

U.S. PATENT DOCUMENTS

2012/0190354 A1*    7/2012    Merrien ............... H04B 1/3816
                                                                                455/422.1
2013/0170643 A1*    7/2013    Xiao ....................... H04L 63/10
                                                                                380/270
(Continued)

FOREIGN PATENT DOCUMENTS

KR    20180119651 A    11/2018
WO    WO2008151663 A1    12/2008
(Continued)

OTHER PUBLICATIONS

China Mobile, "Discussion and pCR for privacy calculation in UE side", S3-180533, 3GPP TSG SA WG3 (Security) Meeting #90bis, Feb. 2018, section 3, 4 pages.
(Continued)

*Primary Examiner* — Mohammad W Reza
(74) *Attorney, Agent, or Firm* — Lee & Hayes, P.C.

(57) ABSTRACT

A 5G user equipment (UE) can register for 5G services with a telecommunication network in part using a Subscription Concealed Identifier (SUCI), an encrypted version of a subscriber identifier, so that the actual subscriber identifier is not exposed during network registration. Legacy SIMs originally deployed for 4G/LTE and other legacy wireless access technologies store an international mobile subscriber identity (IMSI), but do not store a network public key needed to generate a SUCI. However, a 5G UE can still use a legacy SIM to securely obtain 5G services by encrypting the IMSI from the legacy SIM using a network public key stored in the 5G UE's own memory to generate a SUCI, and then transmitting the generated SUCI to the telecommunication network during network registration. Accordingly, the IMSI on the legacy SIM is not exposed during network registration.

18 Claims, 6 Drawing Sheets

(51) Int. Cl.
*H04W 8/18* (2009.01)
*H04W 12/02* (2009.01)
*H04L 9/08* (2006.01)
*H04W 8/02* (2009.01)
*H04W 4/60* (2018.01)
*H04W 12/72* (2021.01)

(52) U.S. Cl.
CPC .............. *H04W 8/02* (2013.01); *H04W 8/183* (2013.01); *H04W 12/02* (2013.01); *H04W 12/72* (2021.01)

(58) Field of Classification Search
CPC ...... H04W 4/00; H04W 60/00; H04L 9/3066; H04L 9/0825; H04L 2209/80; H04L 9/0894
USPC .......................................................... 380/28
See application file for complete search history.

(56) References Cited

U.S. PATENT DOCUMENTS

| | | | |
|---|---|---|---|
| 2014/0148162 A1* | 5/2014 | Maharaj | H04W 12/06 455/435.2 |
| 2015/0181419 A1 | 6/2015 | Mistry et al. | |
| 2018/0013568 A1* | 1/2018 | Muhanna | H04L 63/045 |
| 2020/0213843 A1 | 7/2020 | An et al. | |
| 2021/0021993 A1 | 1/2021 | Yang et al. | |
| 2021/0092603 A1 | 3/2021 | Yang et al. | |

FOREIGN PATENT DOCUMENTS

| | | |
|---|---|---|
| WO | WO2016209126 A1 | 12/2016 |
| WO | WO2017007725 A1 | 1/2017 |

OTHER PUBLICATIONS

Ericsson, "Protection scheme selection using legacy USIM", S3-181919, 3GPP TSG-SA WG3 Meeting #91Bis, May 2018, Section 6.12.2, 5 pages.
Gemalto, "Comments to S3-171776 on Storage, processing and provisioning of the home network public key", S3-172071, 3GPP TSG SA WG3 (Security) Meeting #88, Aug. 2017, Section 2, 5.1.4, 4 pages.
Khan, et. al., "Defeating the Downgrade Attack on Identity Privacy in 5G", In: SSR 2018: Security Standardisation Research, Nov. 6, 2018, sections 3, 4.2-4.3, 5.4; and figure 4, p. 1-25.
The PCT Search Report and Written Opinion dated Mar. 26, 2020, for PCT Application No. PCT/US2019/064236, 10 pages.
The PCT Search Report and Written Opinion dated Apr. 7, 2020 for PCT Application No. PCT/US2019/065224, 11 pages.
Office Action for U.S. Appl. No. 16/235,191, dated Apr. 29, 2021, An, "5G Service Compatible 4G SIM", 16 Pages.

* cited by examiner

5G DEVICE COMPATIBILITY WITH LEGACY SIM

BACKGROUND

A subscriber identity module (SIM), such as a SIM card, can store information that identifies a particular subscriber to telecommunication network services. For example, a 4G/LTE SIM can store an international mobile subscriber identity (IMSI) that user equipment (UE) can provide to a telecommunication network during network registration. The telecommunication network can then use the IMSI to authenticate and/or authorize the subscriber. However, some messages transmitted for network registration for 4G/LTE and other types of legacy connections include an IMSI in plain text. Because such messages can expose an IMSI in the clear, there is a security risk of an exposed IMSI being intercepted by an unauthorized party.

Because of this security risk associated with 4G/LTE and other legacy wireless access technologies, 5G wireless access technology has been developed with standards that can enhance security by keeping subscriber identifiers private during network registration. In 5G, a particular subscriber can be identified with a Subscription Permanent Identifier (SUPI), which in some cases can be an IMSI. However, instead of exposing a subscriber's SUPI/IMSI during network registration for 5G services, a 5G UE can transmit an encrypted version of the SUPI/IMSI known as a Subscription Concealed Identifier (SUCI) to the telecommunication network. The telecommunication network can decrypt the SUPI/IMSI from the SUCI, and use it authenticate and/or authorize the subscriber.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Figure 1:
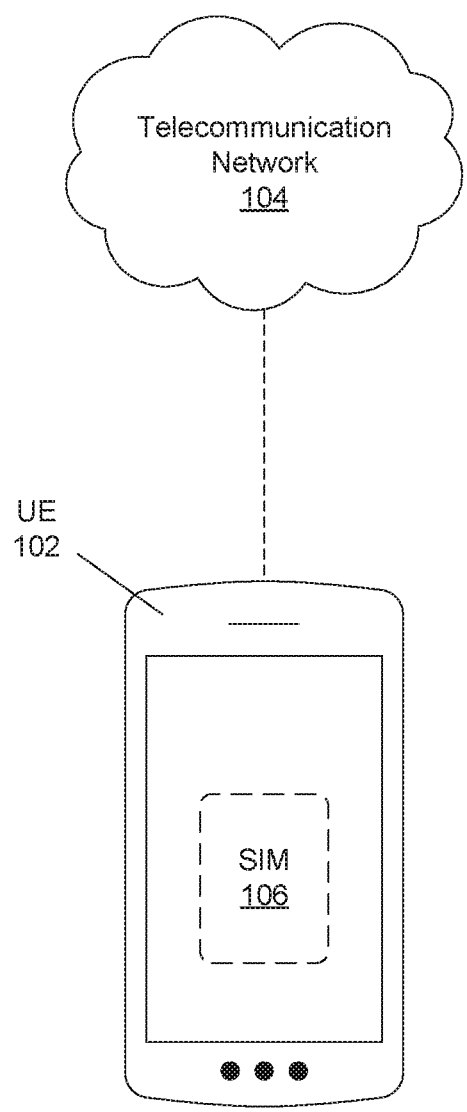
FIG. 1 depicts an example environment in which user equipment (UE) can connect to a telecommunication network.

User equipment (UE) can connect to telecommunication networks to make or receive calls, transmit or receive messages and/or other data, and/or perform any other network operation. UEs and telecommunication networks can be compatible with one or more generations of wireless access technologies, including fifth generation (5G) wireless access technologies and fourth generation (4G) wireless access technologies such as Long Term Evolution (LTE) technology. Relative to 4G/LTE and older legacy wireless access technologies, 5G wireless access technology can offer enhanced security, better data transfer speeds, lower latencies, and other benefits.

A UE can initiate a network registration process when it boots up, during which the UE can transmit a subscriber identifier to the telecommunication network based on information stored in the UE's subscriber identity module (SIM). The telecommunication network can determine if the provided subscriber identifier corresponds with a subscriber to the telecommunication network's services, and if so which services that subscriber is allowed to access. If the subscriber identifier is authenticated, the UE can be registered and a connection can be established between the UE and the telecommunication network.

During registration for a connection using 4G/LTE or other legacy wireless access technologies, the subscriber identifier sent during the registration process can be an international mobile subscriber identity (IMSI) number. However, for such legacy connections, the IMSI is generally sent in the clear without encryption during network registration, such that there is a risk that an unauthorized entity can intercept the IMSI.

In contrast, 5G standards have been developed to protect IMSIs from being exposed during network registration. 5G standards indicate that a Subscription Permanent Identifier (SUPI), which in some examples can be an IMSI, should be stored on the UE's SIM along with a public key of the telecommunication network. The UE's SIM or the UE can use the SUPI and the public key that are both stored on the SIM to generate a Subscription Concealed Identifier (SUCI), an encrypted version of the SUPI. Instead of transmitting the IMSI-equivalent SUPI in the clear to the telecommunication network during network registration, the 5G UE can transmit the SUCI to the telecommunication network such that the SUPI is not exposed. The telecommunication network can then decrypt the SUCI using its own private key to obtain the SUPI, and thereafter use the SUPI to authenticate the subscriber and complete the network registration.

Users have become accustomed to using old SIM cards with new UEs. For example, when a user purchases a new mobile phone, it is common for the user to remove a SIM card from their old mobile phone and insert it into the new mobile phone to transfer the user's subscription with a telecommunication network to the new mobile phone. However, if a user attempts to use an old 4G/LTE SIM or other legacy SIM with a new 5G UE, the legacy SIM would not contain the information specified by 5G standards. For example, although 5G standards indicate that both a SUPI and a network public key should be stored on a SIM, 4G/LTE and other legacy SIMs generally only store an IMSI and do not have a network public key.

Accordingly, if a 4G/LTE or other legacy SIM is used with a 5G UE, the 5G UE could not use the information natively stored on the legacy SIM to generate a SUCI, and could not complete a 5G network registration or other network operation that relies on transmission of a SUCI. While the 5G UE may be able to provide the IMSI on the legacy SIM to the telecommunication network, in some examples a telecommunication network may respond to being provided with an IMSI in the clear instead of a SUCI by limiting the 5G UE to 4G/LTE or other legacy services. In other examples, a telecommunication network may provide 5G services to a 5G UE that only provides an exposed IMSI instead of a SUCI, but this can lead to the same security risk present in 4G/LTE and other legacy connections that the exposed IMSI can be intercepted.

Described herein are systems and methods by which a 5G UE can use information stored on a 4G/LTE SIM or other legacy SIM to generate a SUCI, such that the 5G UE can use the generated SUCI during network operations to avoid exposing an IMSI on the legacy SIM. This can allow users to seamlessly re-use old legacy SIMs with new 5G UEs instead of having to obtain new 5G SIMs. This can also allow telecommunication networks to securely provide 5G services to 5G UEs with legacy SIMs, instead of limiting them to 4G/LTE or other legacy services or compromising security for 5G networks by allowing IMSIs from legacy SIMs to be exposed in the clear.

Example Environments

FIG. 1 depicts an example environment in which user equipment (UE) 102 can connect to a telecommunication network 104 to make or receive calls, transmit or receive messages and/or other data, and/or perform any other network operation. The UE 102 can have a subscriber identity module (SIM) 106, such as a SIM card inserted into the UE 102, that contains information allowing the UE 102 to be registered and authenticated with the telecommunication network 104. A UE 102 can be a mobile phone, a personal digital assistant (PDA), a tablet, a computer, a hotspot, a smart watch, or any other type of computing or communication device that uses information on a SIM 106 during network registration with a telecommunication network 104.

Connections between a UE 102 and the telecommunication network 104 can be based on one or more wireless access technologies, including fifth generation (5G) wireless access technologies, fourth generation (4G) wireless access technologies such as Long Term Evolution (LTE)/LTE Advanced technology, and/or other older wireless access technologies including High-Speed Data Packet Access (HSDPA)/Evolved High-Speed Packet Access (HSPA+) technology, Universal Mobile Telecommunications System (UMTS) technology, Code Division Multiple Access (CDMA) technology, or Global System for Mobile Communications (GSM) technology, or any other earlier or later generation of wireless access technology.

5G wireless access technologies can offer various advancements relative to 4G/LTE and older legacy wireless access technologies. For example, 5G wireless access technologies can provide UEs 102 with enhanced security, higher data transfer speeds, lower latencies, and other benefits relative to 4G/LTE wireless access technologies. However, generally UEs 102 need 5G-compatible components, such as antennas, chipsets, modems, software, or other 5G elements, to connect to a telecommunication network using a 5G connection. Accordingly, many 4G/LTE-compatible UEs 102 may not be compatible with 5G wireless access technologies and users may need to upgrade to new 5G-compatible UEs 102 to take advantage of the benefits provided by 5G wireless access technologies.

Figure 2:
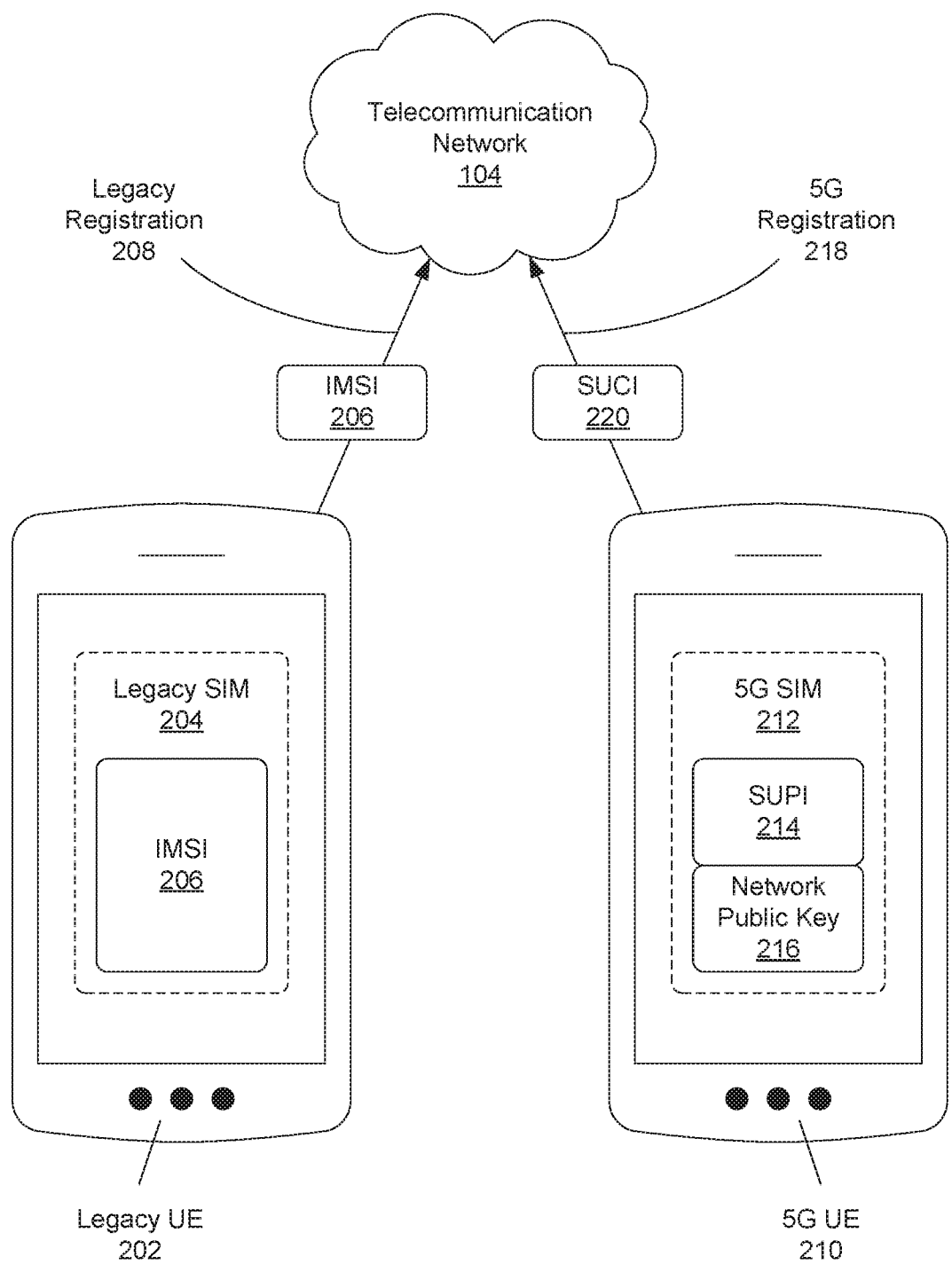
FIG. 2 depicts differing registration processes for legacy network connections and 5G network connections.

FIG. 2 depicts differing registration processes for legacy network connections and 5G network connections. For example, a legacy UE 202, such as a UE 102 that is compatible with 4G/LTE or other legacy wireless access technologies, can have a legacy SIM 204 that stores an international mobile subscriber identity (IMSI) 206 associated with a particular subscriber. As part of a legacy registration 208 with a telecommunication network 104, the legacy UE 202 can transmit the IMSI 206 from the legacy SIM 204 to the telecommunication network 104 in the clear.

As another example, a 5G UE 210, such as a UE 102 that is compatible with 5G wireless access technologies, can have a 5G SIM 212 that stores a Subscription Permanent Identifier (SUPI) 214 and a network public key 216. The SUPI 214 can be associated with a particular subscriber, and in some examples can be the same as an IMSI 206 associated with that subscriber. The network public key 216 can be part of an asymmetric cryptographic key pair associated with the telecommunication network 104. In some examples, the network public key 216 can also be referred to as a mobile network operator (MNO) public key or a home network public key.

If a 5G UE 210 has a 5G SIM 212 that stores both a SUPI 214 and a network public key 216, the 5G UE 210 can perform a 5G registration 218 with the telecommunication network 104 during which the SUPI 214 is not exposed. Instead, as part of the 5G registration 218, the 5G UE 210 or the 5G SIM 212 can use the SUPI 214 and the network public key 216 that are both stored on the 5G SIM 212 to generate a Subscription Concealed Identifier (SUCI) 220. The 5G UE 210 can then transmit the SUCI 220, instead of the SUPI 214, during the 5G registration 218. An example system architecture for a 5G UE 210 is described in more detail below with respect to FIG. 5.

A telecommunication network 104 can receive a SUCI 220 from a 5G UE 210 during 5G registration 218. The telecommunication network 104 can decrypt the SUCI 220 to obtain the original SUPI 214 using a network private key that corresponds to the network public key 216. The telecommunication network 104 can perform authorization and/or authentication processes based on the decrypted SUPI 214, such as whether the SUPI 214 corresponds to an authorized subscriber and/or which services are accessible to that subscriber. If the authorization and/or authentication based on the SUPI 214 is successful, the 5G registration 218 can be completed, and a 5G connection can be established between the 5G UE 210 and the telecommunication network 104.

Figure 3:
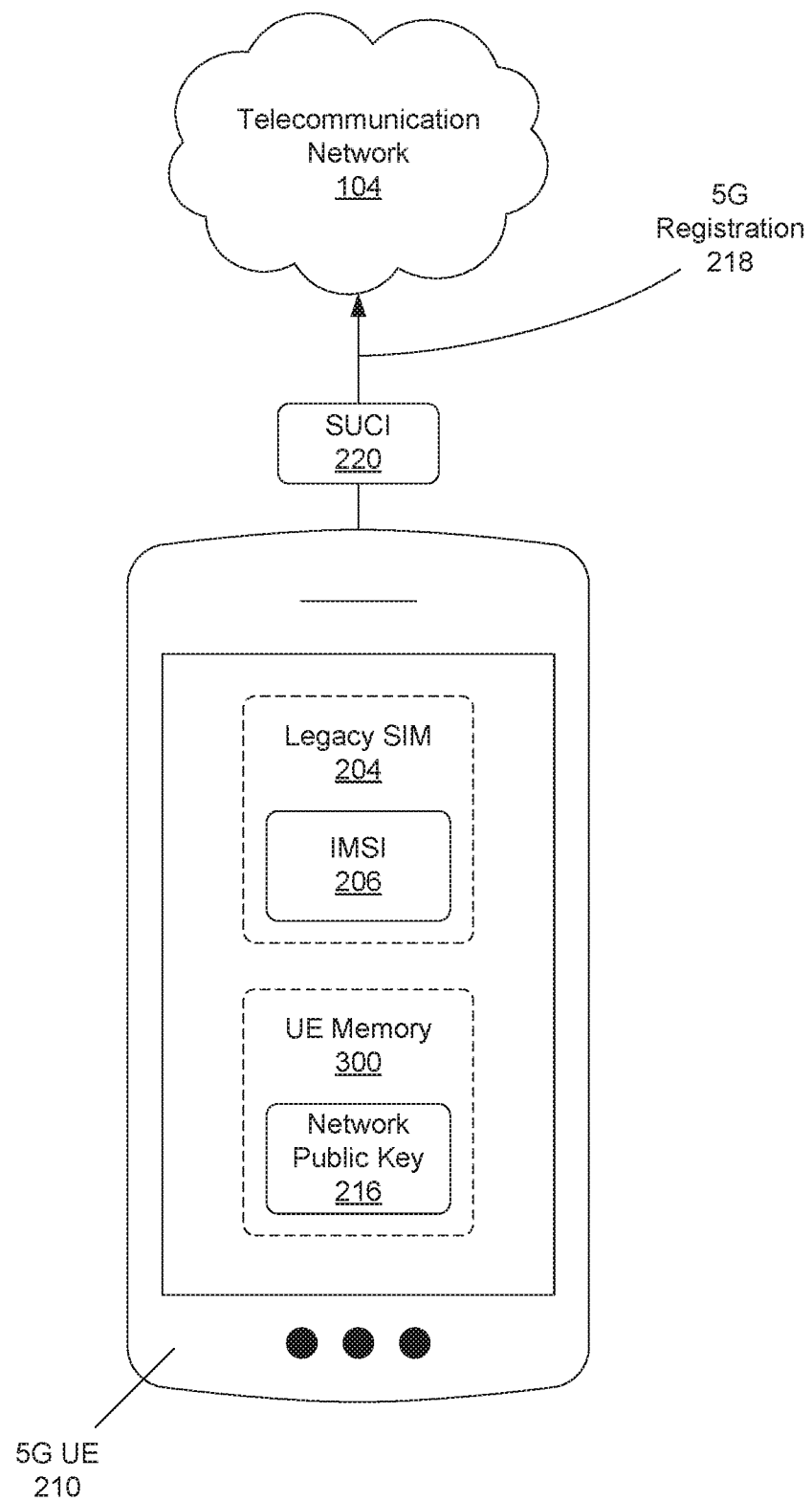
FIG. 3 depicts 5G registration in a situation wherein a 5G UE has a legacy subscriber identity module (SIM) instead of a 5G SIM.

FIG. 3 depicts 5G registration 218 in a situation wherein a 5G UE 210 has a legacy SIM 204 instead of a 5G SIM 212. As described above, a legacy SIM 204 may be a SIM 106 that stores an IMSI 206, and may have been originally deployed to enable 4G/LTE or older legacy connections. Although a legacy SIM 204 can be inserted into a 5G UE 210, as shown in FIG. 2 the legacy SIM 204 would not natively have a network public key 216 that could be used to generate a SUCI 220 that could be transmitted during a 5G registration 218.

However, a network public key 216 can be provisioned into UE memory 300 of the 5G UE 210. In some examples, a manufacturer of the 5G UE 210 can receive the network public key 216 from an operator of the telecommunication network 104, and provision the network public key 216 into UE memory 300 during manufacture of the 5G UE 210 or prior to shipping the 5G UE 210 to a retailer or an end user. In other examples, the telecommunication network 104 can provide a software update to the 5G UE 210, such as an over-the-air update, that causes the network public key 216 to be stored in the UE memory 300. For example, the telecommunication network 104 can initially provide a network public key 216 corresponding to its own network private key to a 5G UE 210 via a software update, and/or use software updates to provide new or updated network public keys 216 to a 5G UE 210 over time. In some examples, the network public key 216 can be stored in a secure location or partition in the UE memory 300.

When the 5G UE 210 has a legacy SIM 204 and initiates a 5G registration, the 5G UE 210 can retrieve the IMSI 206 from the legacy SIM 204. The 5G UE 210 can use the IMSI 206 retrieved from the legacy SIM 204 as a SUPI 214. The 5G UE 210 can generate a SUCI 220 using both the IMSI 206 retrieved from the legacy SIM 204 and the network public key 216 in the UE memory 300. The process of retrieving the IMSI 206 from the legacy SIM 204 and generating the SUCI 220 based on the network public key 216 in the UE memory 300 can be performed by firmware of the 5G UE 210, an operating system of the 5G UE 210, and/or one or more applications, agents, or modules operable on the 5G UE 210, as described further below with respect to FIG. 5.

Figure 4:
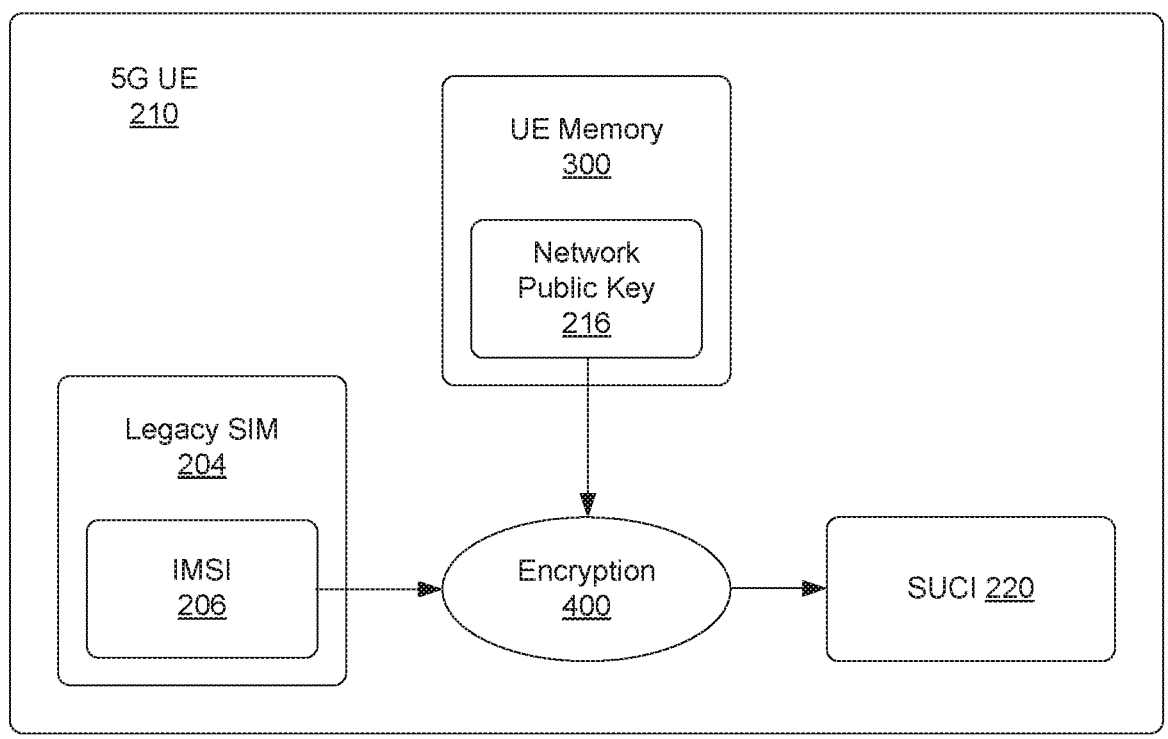
FIG. 4 depicts a 5G UE generating a Subscription Concealed Identifier (SUCI) at least in part by performing encryption on an international mobile subscriber identity (IMSI) retrieved from a legacy SIM using a network public key stored in UE memory.

As shown in FIG. 4, a 5G UE 210 can generate a SUCI 220 at least in part by performing encryption 400 on an IMSI 206 retrieved from a legacy SIM 204 using a network public key 216 stored in UE memory 300. In some examples, the SUCI 220 can be generated by encrypting the IMSI 206 serving as a SUPI 214 with the network public key 216 using elliptic curve cryptography, such as the Elliptic Curve Integrated Encryption Scheme (ECIES) defined in 3GPP TS 33.501. In other examples, any other encryption scheme or algorithm can be used for the encryption 400 of the IMSI 206 with the network public key 216 during generation of the SUCI 220.

Accordingly, because a 5G UE 210 can generate a SUCI 220 based on a network public key 216 in its own UE memory 300 and on an IMSI 206 stored in a legacy SIM 204, a user can use a legacy SIM 204 with a 5G UE 210 and still securely obtain 5G services via a 5G registration 218 that uses a SUCI 220. For example, the systems and processes described herein can allow a user upgrading from a legacy UE 202 to a 5G UE 210 to remove a legacy SIM 204 from the legacy UE 202 and re-use the legacy SIM 204 with the 5G UE 210. This can simplify the process of upgrading to a new UE 102 for users, as well as saving users money by not requiring them to buy new 5G SIMs 212. Additionally, the systems and processes described herein can allow a telecommunication network 104 to avoid performing processes for updating already-deployed legacy SIMs 204 to store new network public keys 216 so that the legacy SIMs 204 would become natively 5G-compatible. The systems and processes described herein can also allow a telecommunication network 104 to provide 5G services to a 5G UE 210 with a legacy SIM 204 in a secure manner that does not involve exposing an IMSI 206 from the legacy SIM 204.

Although the description herein refers to a 5G UE 210 and a 5G registration 218 for a 5G connection in situations in which the 5G UE 210 has a legacy SIM 204, it should be understood that a substantially similar process by a 5G UE 210 or any later generation UE 102 for any network process in which the 5G UE 210 or later generation UE 102 is expected to transmit a SUCI 220 to a telecommunication network 104 but has a legacy SIM 204 that is not storing a network public key 216.

Example Architecture

Figure 5:
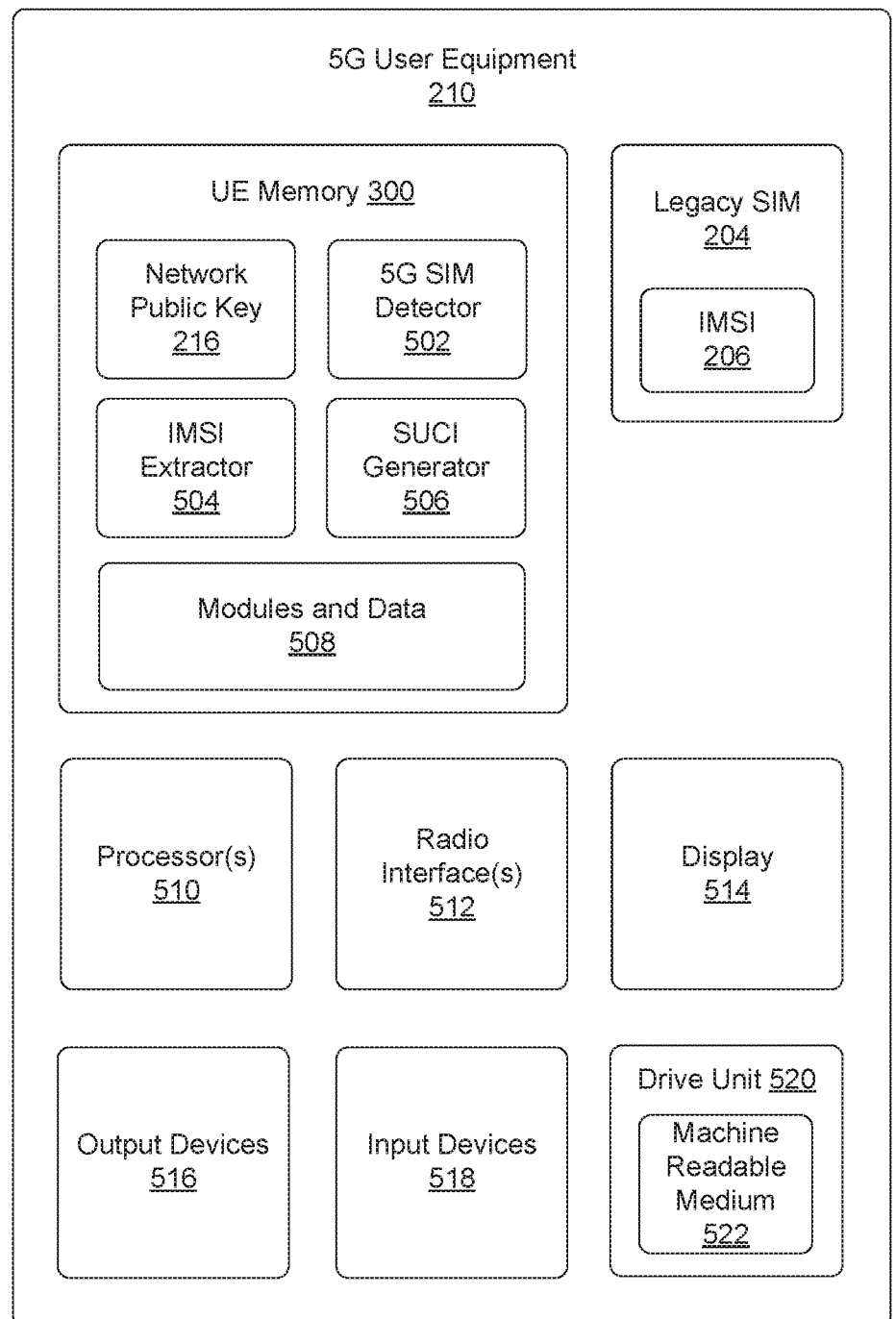
FIG. 5 depicts an example system architecture for a 5G UE.

FIG. 5 depicts an example system architecture for a 5G UE 210, in accordance with various examples. Although FIG. 5 depicts a 5G UE 210, in other examples FIG. 5 can represent any other generation of UE 102 that needs a SUCI 220 for network registration or any other network process but has a legacy SIM 204 that does not include a network public key 216.

As shown, a 5G UE 210 can include a UE memory 300 that stores a network public key 216, a 5G SIM detector 502, an IMSI extractor 504, a SUCI generator 506, and other modules and data 508. The 5G UE 210 can also include a legacy SIM 204 that stores an IMSI 206, processor(s) 510, radio interfaces 512, a display 514, output devices 516, input devices 518, and/or a drive unit 520 including a machine readable medium 522.

In various examples, UE memory 300 can include system memory, which may be volatile (such as RAM), non-volatile (such as ROM, flash memory, etc.) or some combination of the two. UE memory 300 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the 5G UE 210. Any such non-transitory computer-readable media may be part of the 5G UE 210.

As discussed above, the UE memory 300 can store a network public key 216. In some examples, the network public key 216 can be provisioned in the UE memory 300 by a manufacturer of the 5G UE 210. In other examples, a telecommunication network 104 can provide an update, such as an over-the-air update, that causes the network public key 216 to be written to the UE memory 300. For example, a telecommunication network 104 can provide a 5G UE 210 with a new or updated network public key 216 over wireless network transmissions, and the 5G UE 210 can store that network public key 216 in its UE memory 300. In some examples, the network public key 216 can be stored in a secure location or partition in the UE memory 300.

The UE memory 300 can also store a 5G SIM detector 502. In some examples, the 5G SIM detector can evaluate a SIM 106 inserted into the 5G UE 210, and determine whether or not a SUPI 214 and/or a network public key 216 is stored on the SIM 106. If a SUPI 214 and a network public key 216 is stored on the SIM 106, the 5G SIM detector 502 can determine that the SIM 106 is a 5G SIM 212, and the 5G UE 210 or the 5G SIM 212 can use standard processes to generate a SUCI 220 from the SUPI 214 and the network public key 216 stored on the 5G SIM 212. However, if the 5G SIM detector 502 determines that the SIM 106 does not contain a network public key 216, the 5G SIM detector 502 can consider the SIM 106 to be a legacy SIM 204. In other examples, the 5G SIM detector 502 can distinguish between 5G SIMs 212 and legacy SIMs 204 based on a file structure, file system, SIM generation identifier, and/or other information that identifies whether a SIM 106 is a 5G SIM 212 or a legacy SIM 204. When the 5G SIM detector 502 determines that an inserted SIM 106 is a legacy SIM 204, the 5G SIM detector 502 can trigger the IMSI extractor 504 and/or SUCI generator 506 to cause a new SUCI 220 to be generated based on an IMSI 206 stored on the legacy SIM 204 and the network public key 216 stored in the UE memory 300.

The IMSI extractor 504 can locate and retrieve an IMSI 206 on a legacy SIM 204. The IMSI extractor 504 can pass the retrieved IMSI 206 to the SUCI generator 506, such that the SUCI generator 506 can use the IMSI 206 as a SUPI 214 when generating a SUCI 220.

The SUCI generator 506 can generate a SUCI 220 at least in part by encrypting an IMSI 206 from a legacy SIM 204 using a network public key 216 stored in the UE memory 300. For example, the SUCI generator 506 can use an IMSI 206 extracted from the legacy SIM 204 by the IMSI extractor 504 as a SUPI 214, and encrypt the IMSI/SUPI using the network public key 216 stored in the UE memory 300 based on elliptic curve cryptography or any other encryption scheme. The SUCI 220 output by the SUCI generator 506 can be stored in the UE memory 300 and/or be transmitted to a telecommunication network 104 as part of 5G registration 218.

The UE memory 300 can also store other modules and data 508 that can be utilized by the 5G UE 210 to perform or enable performing any action taken by the 5G UE 210. The modules and data 508 can include a UE platform and applications, and data utilized by the platform and applications.

In various examples, the processor(s) 510 can be a central processing unit (CPU), a graphics processing unit (GPU), or both CPU and GPU, or any other type of processing unit. Each of the one or more processor(s) 510 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 510 may also be responsible for executing all computer applications stored in the UE memory 300, which can be associated with common types of volatile (RAM) and/or nonvolatile (ROM) memory.

The radio interfaces 512 can include transceivers, modems, interfaces, antennas, and/or other components that perform or assist in exchanging radio frequency (RF) communications with a base station of a wireless telecommunication network, or an alternate access point through which the 5G UE 210 can reach a telecommunication network 104. One or more radio interfaces 512 of the 5G UE 210 can be compatible with 5G wireless access technologies. In some examples, one or more radio interfaces 512 of the 5G UE 210 can also be compatible with other wireless access technologies, including 4G/LTE wireless access technologies and/or other legacy wireless access technologies, Wi-Fi, and/or any other type of wireless connection.

The display 514 can be a liquid crystal display or any other type of display commonly used in UEs 102. For example, display 514 may be a touch-sensitive display screen, and can then also act as an input device or keypad, such as for providing a soft-key keyboard, navigation buttons, or any other type of input.

The output devices 516 can include any sort of output devices known in the art, such as a display 514, speakers, a vibrating mechanism, and/or a tactile feedback mechanism. Output devices 516 can also include ports for one or more peripheral devices, such as headphones, peripheral speakers, and/or a peripheral display.

The input devices 518 can include any sort of input devices known in the art. For example, input devices 518 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 522 can store one or more sets of instructions, such as software or firmware, that embodies any one or more of the methodologies or functions described herein. The instructions can also reside, completely or at least partially, within the UE memory 300, processor(s) 510, and/or radio interface(s) 512 during execution thereof by the 5G UE 210. The UE memory 300 and the processor(s) 510 also can constitute machine readable media 522.

Example Operations

Figure 6:
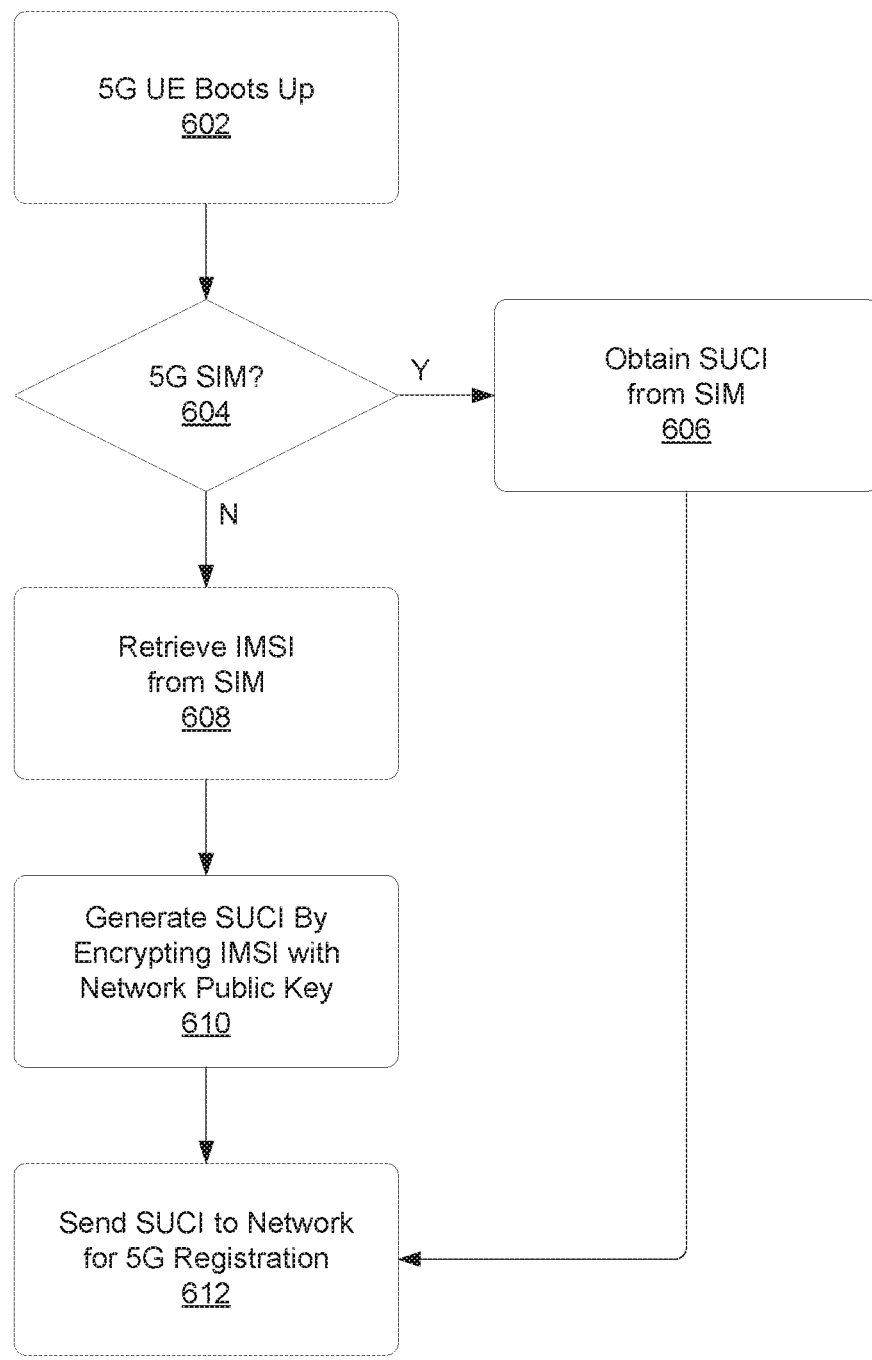
FIG. 6 depicts an example process that a 5G UE can use to obtain a SUCI for a network operation.

FIG. 6 depicts an example process that a 5G UE 210 can use to obtain a SUCI 220 for a network operation, such as 5G registration 218. The process of FIG. 6 can be used by a 5G UE 210 or later generation UE 102 that needs a SUCI 220 but has a legacy SIM 204 that does not include a network public key 216.

At block 602, the 5G UE 210 can boot up. For example, the 5G UE 210 can power on and/or load an operating system.

At block 604, after initiation of the boot up process, the 5G UE 210 can analyze a SIM 106 inserted into the 5G UE 210 to determine if the SIM 106 is a 5G SIM 212 or a legacy SIM 204. In some examples, the 5G UE 210 can determine that the SIM 106 is a 5G SIM 212 based on the presence of both a SUPI 214 and a network public key 216 stored on the SIM 106, and/or based on the presence of an already-generated SUCI 220 stored on the SIM 106. Accordingly, the 5G UE 210 can also determine that the SIM 106 is not a 5G SIM 212 and is instead a legacy SIM 204 if it includes an IMSI 206 and does not include a network public key 216. In other examples, the 5G UE 210 can determine whether the SIM 106 is a 5G SIM 212 or a legacy SIM 204 based on a file structure, file system, SIM generation identifier, and/or other information.

If at block 604 the 5G UE 210 determines that the SIM 106 is a 5G SIM 212, the 5G UE 210 can move to block 606 and obtain a SUCI 220, either by retrieving a SUCI 220 stored on the 5G SIM 212 that has already been generated by the 5G SIM 212 or by generating a SUCI 220 based on the SUPI 214 and the network public key 216 that are both stored on the 5G SIM 212. The 5G UE 210 can move to block 612 to use the SUCI 220 in a 5G registration 218, or in any other network process involving a SUCI 220.

However, if at block 604 the 5G UE 210 determines that the SIM 106 is a legacy SIM 204 that includes an IMSI 206 and does not include a network public key 216, the 5G UE 210 can move to block 608 and retrieve the IMSI 206 from the legacy SIM 204.

At block 610, the 5G UE 210 can generate a SUCI 220 using the IMSI 206 retrieved from the legacy SIM 204 and a network public key 216 stored in UE memory 300 of the 5G UE 210. For example, the 5G UE 210 can generate a SUCI 220 at least in part by using the retrieved IMSI 206 as a SUPI 214, and by using the network public key 216 from the UE memory 300 to encrypt the IMSI/SUPI based on elliptic curve cryptography or any other encryption scheme.

At block 612, the 5G UE 210 can transmit the SUCI 220 to a telecommunication network as part of 5G registration

218. Alternatively, at block 612 the 5G UE 210 can use the SUCI 220 for any other network process involving a SUCI 220.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
    determining, by a fifth generation (5G) user equipment (UE), that a subscriber identity module (SIM) of the 5G UE is a legacy SIM that stores an international mobile subscriber identity (IMSI), wherein the legacy SIM is a fourth generation (4G)/Long Term Evolution (LTE) SIM or a pre-4G SIM;
    retrieving, by the 5G UE, the IMSI from the legacy SIM;
    generating, by the 5G UE, a Subscription Concealed Identifier (SUCI) at least in part by encrypting the IMSI with a network public key stored in memory of the UE; and
    transmitting, by the 5G UE, the SUCI to a telecommunication network.

2. The method of claim 1, wherein transmitting the SUCI to the telecommunication network is performed as part of a network registration process for 5G services.

3. The method of claim 1, wherein the encrypting is based on elliptic curve cryptography.

4. The method of claim 1, further comprising retrieving, by the 5G UE, the network public key from a manufacturer configuration of the memory.

5. The method of claim 1, further comprising retrieving, by the 5G UE, the network public key from a configuration of the memory based on a software update received from the telecommunication network.

6. The method of claim 1, wherein the network public key corresponds to a network private key held by the telecommunication network, the network public key and the network private key being part of an asymmetric cryptographic key pair.

7. The method of claim 1, wherein the 5G UE determines that the SIM is a legacy SIM based on a presence of the IMSI on the SIM and an absence of the network public key on the SIM.

8. A fifth generation (5G) user equipment (UE) comprising:
    one or more processors;
    a subscriber identity module (SIM); and
    memory storing a network public key and computer-executable instructions that, when executed by the one or more processors, cause the 5G UE to perform operations comprising:
        determining whether the SIM is a legacy SIM that stores an international mobile subscriber identity (IMSI) or is a 5G SIM that stores a Subscription Concealed Identifier (SUCI);
        retrieving the IMSI or the SUCI from the SIM;
        when the SIM is a legacy SIM, generating the SUCI at least in part by encrypting the IMSI with the network public key stored in the memory of the UE; and
        transmitting the SUCI to a telecommunication network.

9. The 5G UE of claim 8, wherein the legacy SIM is a fourth generation (4G)/Long Term Evolution (LTE) SIM.

10. The 5G UE of claim 8, wherein the encrypting is based on elliptic curve cryptography.

11. The 5G UE of claim 8, wherein the operations further comprise retrieving the network public key from a manufacturer configuration of the memory or a configuration of the memory based on a software update received from the telecommunication network.

12. The 5G UE of claim 8, wherein the network public key corresponds to a network private key held by the telecommunication network, the network public key and the network private key being part of an asymmetric cryptographic key pair.

13. The 5G UE of claim 8, wherein the 5G UE determines that the SIM is a legacy SIM based on a presence of the IMSI on the SIM and an absence of the network public key on the SIM.

14. One or more non-transitory computer-readable media storing computer-executable instructions that, when executed by one or more processors of a fifth generation (5G) user equipment (UE), cause the one or more processors to perform operations comprising:
    determining whether a subscriber identity module (SIM) of the 5G UE is a legacy SIM that stores an international mobile subscriber identity (IMSI) or is a 5G SIM that stores a Subscription Concealed Identifier (SUCI);
    retrieving the IMSI or the SUCI from the SIM;
    when the SIM is a legacy SIM, generating the SUCI at least in part by encrypting the IMSI with a network public key stored in memory of the 5G UE; and
    transmitting the SUCI to a telecommunication network.

15. The one or more non-transitory computer-readable media of claim 14, wherein the legacy SIM is a fourth generation (4G)/Long Term Evolution (LTE) SIM.

16. The one or more non-transitory computer-readable media of claim 14, wherein the encrypting is based on elliptic curve cryptography.

17. The one or more non-transitory computer-readable media of claim 14, wherein the operations further comprise retrieving the network public key from a manufacturer configuration of the memory or a configuration of the memory based on a software update received from the telecommunication network.

18. The one or more non-transitory computer-readable media of claim 14, wherein the network public key corresponds to a network private key held by the telecommunication network, the network public key and the network private key being part of an asymmetric cryptographic key pair.

* * * * *